(12) United States Patent
Sun et al.

(10) Patent No.: US 11,022,848 B2
(45) Date of Patent: Jun. 1, 2021

(54) SEALING STRUCTURE, MANUFACTURING METHOD OF THE SAME, AND DISPLAY DEVICE

(71) Applicants: ORDOS YUANSHENG OPTOELECTRONICS CO., LTD., Inner Mongolia (CN); BOE TECHNOLOGY GROUP CO., LTD., Beijing (CN)

(72) Inventors: Shicheng Sun, Beijing (CN); Xin Zhao, Beijing (CN); Chenkai Qi, Beijing (CN); Xianlong Fu, Beijing (CN); Zhiqiang Wang, Beijing (CN); Shuang Hu, Beijing (CN); Jianfei Tian, Beijing (CN)

(73) Assignees: ORDOS YUANSHENG OPTOELECTRONICS CO., LTD., Inner Mongolia (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/423,316

(22) Filed: May 28, 2019

(65) Prior Publication Data
US 2020/0033650 A1     Jan. 30, 2020

(30) Foreign Application Priority Data

Jul. 26, 2018    (CN) .......................... 201810832690.5

(51) Int. Cl.
*G02F 1/1339*     (2006.01)
*G02F 1/1335*     (2006.01)
*G02F 1/1337*     (2006.01)

(52) U.S. Cl.
CPC ...... *G02F 1/1339* (2013.01); *G02F 1/133512* (2013.01); *G02F 1/133723* (2013.01); *G02F 2202/28* (2013.01)

(58) Field of Classification Search
CPC ....... G02F 1/1339; G02F 2001/133311; G02F 1/133345
See application file for complete search history.

(56) References Cited

U.S. PATENT DOCUMENTS

2013/0222725 A1*   8/2013   Nakahara .......... G02F 1/133345
                                                         349/42
2016/0147097 A1*   5/2016   Makino ............. G02F 1/133345
                                                         349/33

\* cited by examiner

*Primary Examiner* — Jessica M Merlin
(74) *Attorney, Agent, or Firm* — Leason Ellis LLP

(57) ABSTRACT

A sealing structure, a manufacturing method of the sealing structure and a display device including the sealing structure are provided. The display device includes a first substrate and a second substrate which are opposite to each other, and the display device includes an organic layer, an inorganic layer and a sealant adhesive which are on a side of the first substrate facing the second substrate and are sequentially arranged; the organic layer includes an organic-layer overlap portion, an orthographic projection of the organic-layer overlap portion on the first substrate overlaps an orthographic projection of the sealant adhesive on the first substrate, and the organic-layer overlap portion includes a portion outside a region where the inorganic layer is located.

16 Claims, 5 Drawing Sheets

SEALING STRUCTURE, MANUFACTURING METHOD OF THE SAME, AND DISPLAY DEVICE

This application claims the benefit of Chinese patent application No. 201810832690.5 filed on Jul. 26, 2018, which is hereby entirely incorporated by reference as a part of the present application.

TECHNICAL FIELD

Embodiments of the present disclosure relate to a sealing structure, a manufacturing method of the sealing structure, and a display device.

BACKGROUND

With the rapid development of technology, display devices have been widely used in people's lives. A sealing structure is usually provided in the display device. Taking a liquid crystal display device as an example, the liquid crystal display device includes an array substrate and an opposite substrate (for example, a color filter substrate) which are opposite to each other, and the array substrate and the opposite substrate are connected by a sealant adhesive to form a sealing structure for sealing a liquid crystal material.

SUMMARY

Embodiments of the present disclosure provide a sealing structure, a manufacturing method of the sealing structure and a display device, and the sealing structure has a good sealing effect.

At least one embodiment of the present disclosure provides a display device including a first substrate and a second substrate which are opposite to each other and including an organic layer, an inorganic layer and a sealant adhesive which are on a side of the first substrate facing the second substrate and are arranged sequentially, the organic layer includes an organic-layer overlap portion, an orthographic projection of the organic-layer overlap portion on the first substrate overlaps an orthographic projection of the sealant adhesive on the first substrate, and the organic-layer overlap portion includes a portion outside a region where the inorganic layer is located.

For example, in the display device provided by at least one embodiment of the present disclosure, the inorganic layer is in direct contact with the organic layer.

For example, in the display device provided by at least one embodiment of the present disclosure, the inorganic layer includes a first inorganic-layer pattern, and the first inorganic-layer pattern includes a first inorganic-layer extension portion extending between the organic layer and the sealant adhesive; the organic-layer overlap portion includes a first portion and a second portion which are adjacent to each other, the first portion is covered by the first inorganic-layer extension portion, and the second portion is outside a coverage region of the first inorganic-layer extension portion.

For example, in at least one embodiment of the present disclosure, the display device includes a sealant adhesive region where the sealant adhesive is located and a sealed region sealed by the sealant adhesive and adjacent to the sealant adhesive region; the first inorganic-layer extension portion extends from the sealed region toward the sealant adhesive region.

For example, in the display device provided in at least one embodiment of the present disclosure, the inorganic layer further includes a second inorganic-layer pattern disconnected from the first inorganic-layer pattern, the second inorganic-layer pattern is between the first inorganic-layer pattern and an outer edge of the first substrate in a direction in which the inorganic layer extends, and the second inorganic-layer pattern includes a second inorganic-layer extension portion extending between the organic-layer overlap portion and the sealant adhesive.

For example, in at least one embodiment of the display device, the first substrate has a protrusion exceeding the second substrate, and the second inorganic-layer pattern covers the protrusion.

For example, the display device further includes a first alignment layer, the organic layer, and the inorganic layer and the first alignment layer are sequentially arranged between the first substrate and the sealant adhesive; the first alignment layer includes an alignment-layer extension portion extending between the organic-layer overlap portion and the sealant adhesive, and the alignment-layer extension portion includes a portion outside the inorganic layer.

For example, in the display device provided by at least one embodiment of the present disclosure, the alignment-layer extension portion does not exceed an outer edge of the sealant adhesive.

For example, in the display device provided by at least one embodiment of the present disclosure, an outer edge of the organic layer is between an inner edge of the sealant adhesive and an outer edge of the sealant adhesive; the sealant adhesive is filled between the outer edge of the organic layer and an outer edge of the first substrate.

For example, in at least one embodiment of the present disclosure, the display device further includes a second alignment layer on a side of the second substrate facing the sealant adhesive, and the second alignment layer extends between the sealant adhesive and the second substrate.

For example, in at least one embodiment of the present disclosure, the display device further includes an organic cover layer between the second alignment layer and the second substrate.

For example, in at least one embodiment of the present disclosure, the display device further includes a black matrix layer between the organic cover layer and the second substrate.

For example, in at least one embodiment of the present disclosure, the display device has a display region and a non-display region outside the display region, and the sealant adhesive is in the non-display region.

At least one embodiment of the present disclosure provides a sealing structure including a first substrate and a second substrate which are opposite to each other and including an organic layer, an inorganic layer and a sealant adhesive which are on a side of the first substrate facing the second substrate and are arranged sequentially, the organic layer includes an organic-layer overlap portion, an orthographic projection of the organic-layer overlap portion on the first substrate overlaps an orthographic projection of the sealant adhesive on the first substrate, and the organic-layer overlap portion includes a portion outside a region where the inorganic layer is located.

For example, in the sealing structure provided by at least one embodiment of the present disclosure, the inorganic layer includes a first inorganic-layer pattern, and the first inorganic-layer pattern includes a first inorganic-layer extension portion extending between the organic layer and the sealant adhesive; the organic-layer overlap portion includes a first portion and a second portion which are adjacent to each other, the first portion is covered by the first inorganic-layer extension portion, and the second portion is outside a coverage region of the first inorganic-layer extension portion.

For example, in at least one embodiment of the present disclosure, the sealing structure includes a sealant adhesive region where the sealant adhesive is located and a sealed region sealed by the sealant adhesive and adjacent to the sealant adhesive region; the first inorganic-layer extension portion extends from the sealed region toward the sealant adhesive region.

For example, in the sealing structure provided by at least one embodiment of the present disclosure, the inorganic layer further includes a second inorganic-layer pattern disconnected from the first inorganic-layer pattern, the second inorganic-layer pattern is between the first inorganic-layer pattern and an outer edge of the first substrate in a direction in which the inorganic layer extends, and the second inorganic-layer pattern includes a second inorganic-layer extension portion extending between the organic-layer overlap portion and the sealant adhesive.

For example, in the sealing structure provided by at least one embodiment of the present disclosure, the first substrate has a protrusion exceeding the second substrate, and the second inorganic-layer pattern covers the protrusion.

For example, in at least one embodiment of the present disclosure, the sealing structure further includes a first alignment layer, and the organic layer, the inorganic layer and the first alignment layer are sequentially arranged between the first substrate and the sealant adhesive; the first alignment layer includes an alignment-layer extension portion extending between the organic-layer overlap portion and the sealant adhesive, and the alignment-layer extension portion includes a portion outside the inorganic layer.

At least one embodiment of the present disclosure provides a manufacturing method of a sealing structure, which includes: sequentially forming an organic layer and an inorganic material on the first substrate, so that the first substrate has a sealant adhesive region to be formed with a sealant adhesive and a sealed region surrounded by the sealant adhesive region, and the organic layer and the inorganic material cover the sealant adhesive region and the sealed region; forming an inorganic layer by removing a portion which is included by the inorganic material and is in the sealant adhesive region, so that the inorganic layer exposes a portion of a surface which is included by the organic layer and is in the sealant adhesive region; forming the sealant adhesive in the sealant adhesive region to connect the first substrate and the second substrate opposite to the first substrate by the sealant adhesive.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
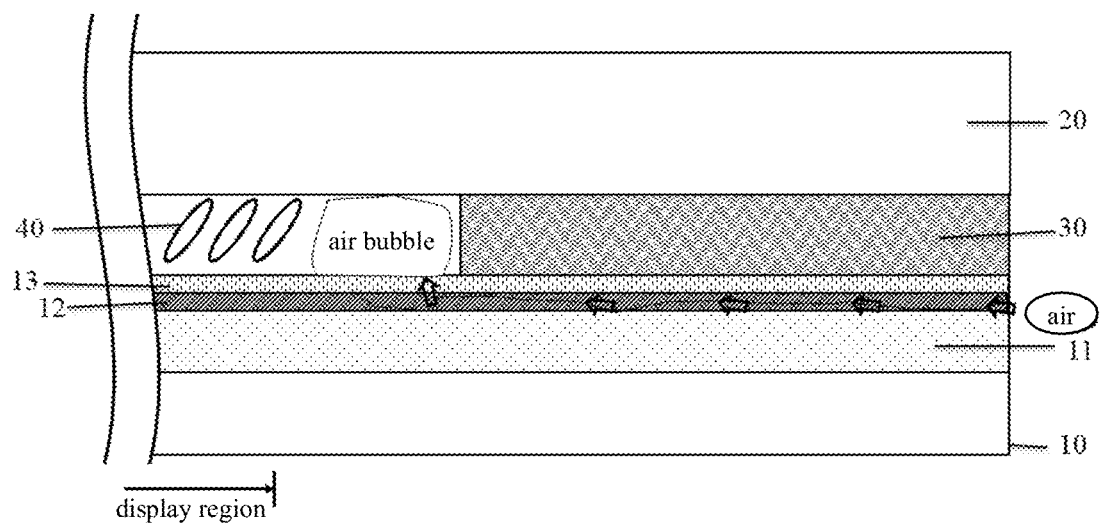
FIG. 1 is a schematic view of a liquid crystal display device.

FIG. 1 is a schematic view of a liquid crystal display device. As shown in FIG. 1, the liquid crystal display device includes a first substrate 10, a second substrate 20, a sealant adhesive 30 and a liquid crystal material 40. The sealant adhesive 30 is located outside a display region and connects the first substrate 10 and the second substrate 20 opposite to each other to form a liquid crystal cell filled with the liquid crystal material 40; the liquid crystal display device further includes an organic layer 11, an inorganic layer 12 and an alignment layer 13 which are sequentially disposed on the first substrate 10, the sealant adhesive 30 connects the organic layer 11 by the alignment layer 13 and the inorganic layer 12, and an outer edge of the sealant adhesive 30, an outer edge of the alignment layer 13 and an outer edge of the inorganic layer 12 are aligned with each other.

The inventors of the present application have noted in the study that in the liquid crystal display device shown in FIG. 1, the inorganic layer 12 is usually thin, the thin inorganic layer 12 is likely to be warped and has a poor adhesion effect with the alignment layer 13 and the organic layer 11, the thin inorganic layer 12 is prone to cracking under the influence of an external impact force, and an edge portion of the thin inorganic layer 12 is also prone to cracking in the grinding process of a heteromorphic liquid crystal display device, causing that outside air enters the liquid crystal cell to generate air bubbles and affects test results of a pressure cooker test, a peeling off test, etc., thereby affecting the reliability of final product structure.

Embodiments of the present disclosure provide a sealing structure, a manufacturing method of the sealing structure, and a display device including the sealing structure. The sealing structure includes a first substrate and a second substrate which are opposite to each other, and the sealing structure includes an organic layer, an inorganic layer and a sealant adhesive which are disposed on a side of the first substrate facing the second substrate and are sequentially disposed, the organic layer includes an organic-layer overlap portion overlaps the sealant adhesive (i.e., an orthographic projection of the organic-layer overlap portion on the first substrate overlaps an orthographic projection of the sealant adhesive on the first substrate), and the organic-layer overlap portion includes a portion outside a region where the inorganic layer is located, that is, the orthographic projection of the organic-layer overlap portion on the first substrate includes a portion outside an orthographic projection of the inorganic layer on the first substrate; that is, in a region (sealant adhesive region) where the orthographic projection of the sealant adhesive on the first substrate is located, the orthographic projection of the organic-layer overlap portion does not completely coincide with the orthographic projection of the inorganic layer. In the embodiments of the present disclosure, because the organic-layer overlap portion includes the portion located outside the region where the inorganic layer is located, no inorganic layer is disposed between the portion and the sealant adhesive, so that the adhesion effect between the portion and the sealant adhesive is better, and thus the sealing structure has a better sealing effect.

The sealing structure, the manufacturing method of the sealing structure, and the display device including the sealing structure provided by the embodiment of the present disclosure will be described in detail below with reference to the accompanying drawings.

Figure 2A:
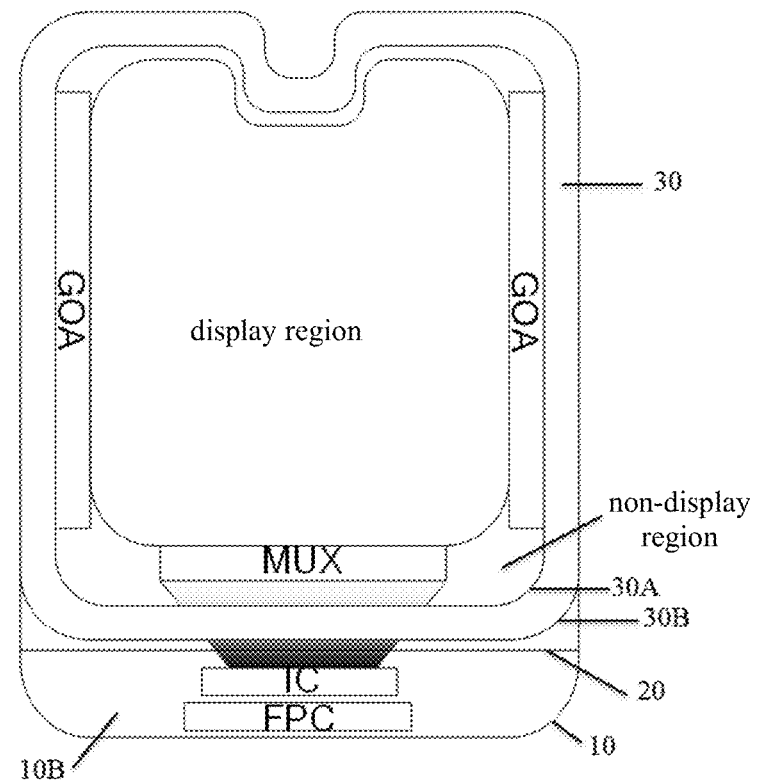
FIG. 2A is a schematic top view 1 of a partial structure of a display device according to at least one embodiment of the present disclosure.
Figure 2B:
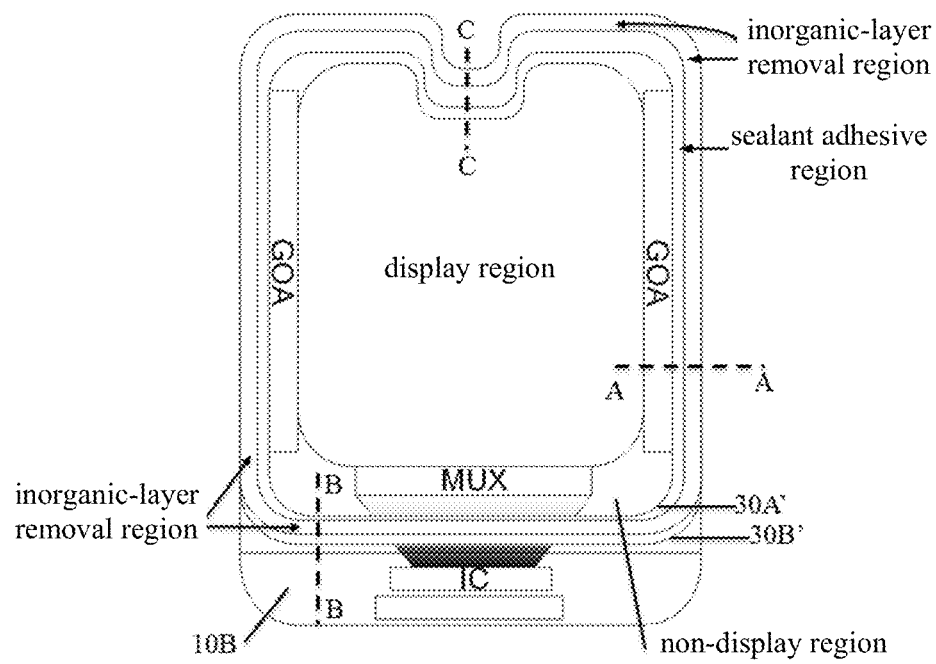
FIG. 2B is a schematic top view 2 of the partial structure of the display device according to at least one embodiment of the present disclosure.
Figure 3A:
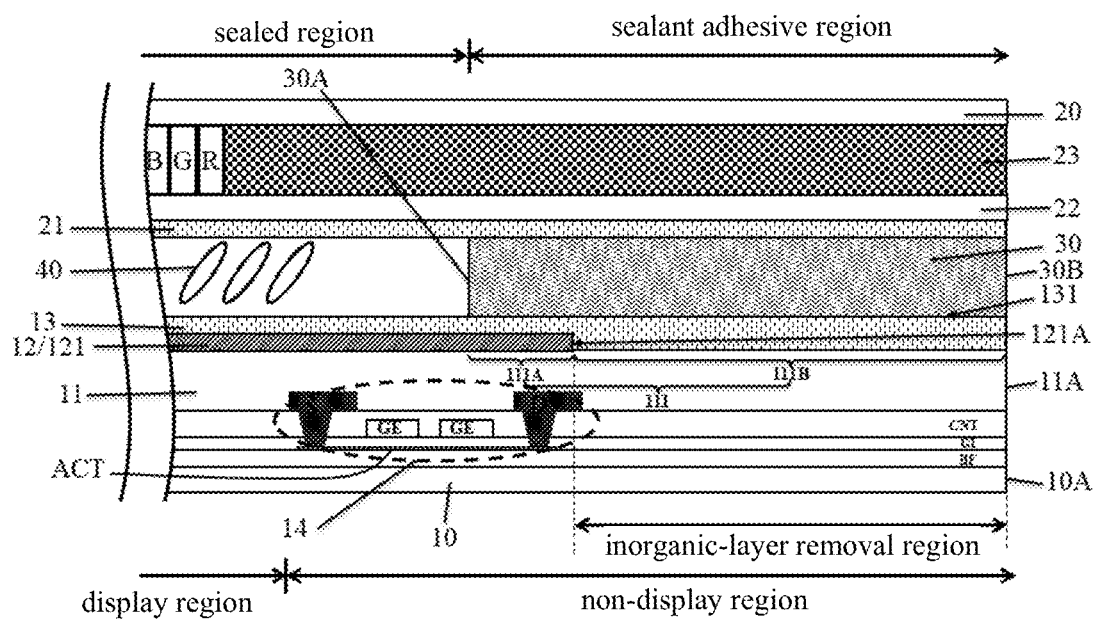
FIG. 3A is a schematic cross-sectional view 1 taken along a line AA in FIG. 2B according to at least one embodiment of the present disclosure.
Figure 3B:
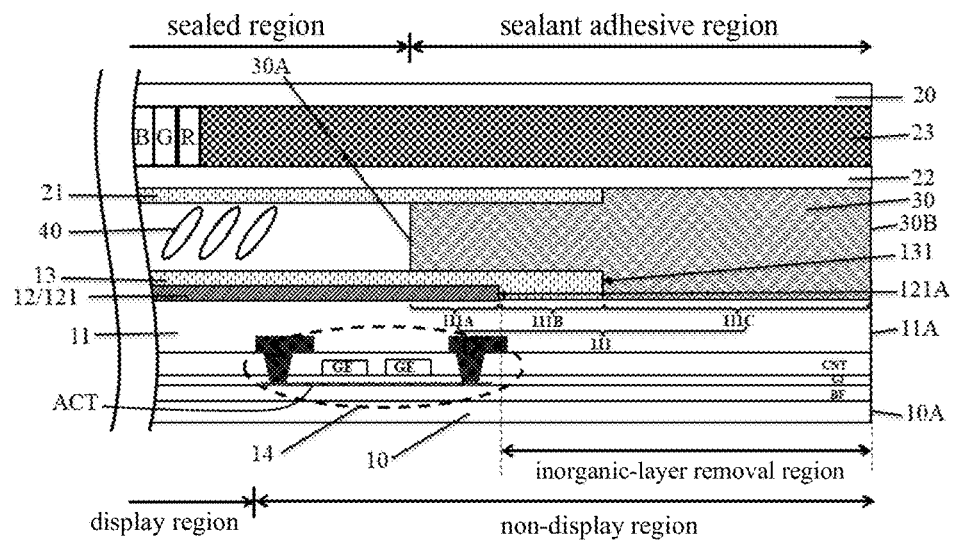
FIG. 3B is a schematic cross-sectional view 2 taken along the line AA in FIG. 2B according to at least one embodiment of the present disclosure.
Figure 3C:
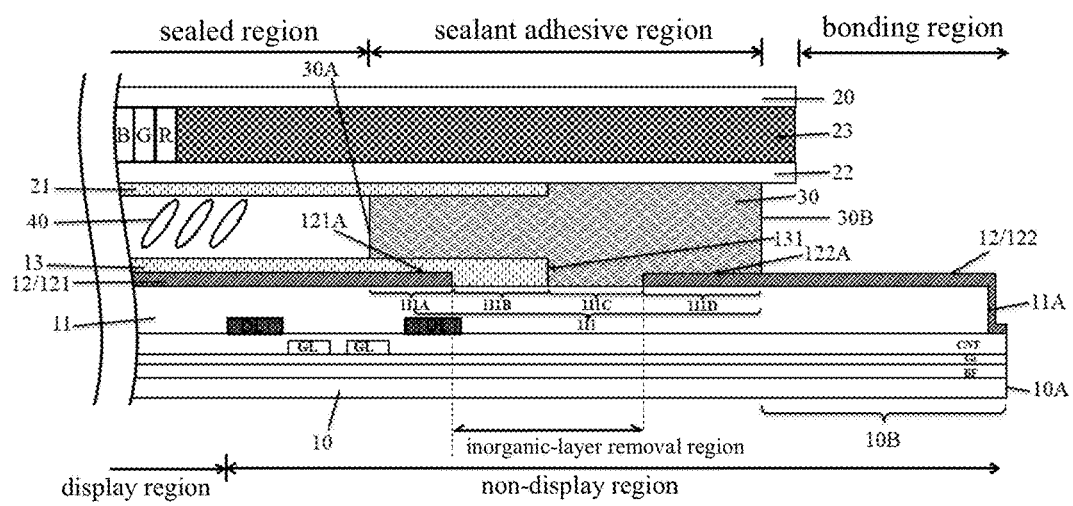
FIG. 3C is a schematic cross-sectional view taken along a line BB in FIG. 2B provided by at least one embodiment of the present disclosure.
Figure 3D:
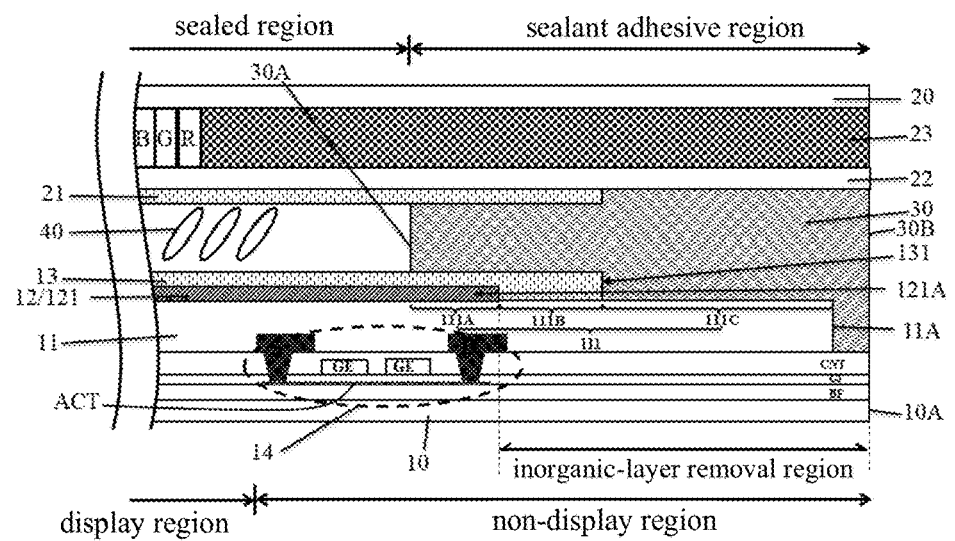
FIG. 3D is a schematic cross-sectional view taken along a line CC in FIG. 2B provided by at least one embodiment of the present disclosure.

FIG. 2A is a schematic top view 1 of a partial structure of the display device according to at least one embodiment of the present disclosure; FIG. 2B is a schematic top view 2 of the partial structure of the display device according to at least one embodiment of the present disclosure; FIG. 3A is a schematic cross-sectional view 1 taken along a line AA in FIG. 2B according to at least one embodiment of the present disclosure; FIG. 3B is a schematic cross-sectional view 2 taken along the line AA in FIG. 2B according to at least one embodiment of the present disclosure; FIG. 3C is a schematic cross-sectional view taken along a line BB in FIG. 2B provided by at least one embodiment of the present disclosure; FIG. 3D is a schematic cross-sectional view taken along a line CC in FIG. 2B provided by at least one embodiment of the present disclosure.

As shown in FIG. 2A to FIG. 3D, at least one embodiment of the present disclosure provides the display device including the first substrate 10 and the second substrate 20 disposed opposite to each other, the display device has a display region (for example, red sub-pixels R, green sub-pixels G and blue sub-pixels B are disposed in the display region) for displaying a picture and a non-display region outside the display region, the sealant adhesive 30 is in the non-display region, and the sealant adhesive 30 connects the first substrate 10 and the second substrate 20 to form a sealed region. For example, the display device provided by at least one embodiment of the present disclosure is a liquid crystal display device, the sealant adhesive 30 connects the first substrate 10 and the second substrate 20 to form a liquid crystal cell for sealing a liquid crystal material 40. Embodiments of the present disclosure include, but are not limited to, the liquid crystal display device.

As shown in FIG. 2A, the sealant adhesive 30 is a closed annular structure and includes an inner edge 30A and an outer edge 30B, and the inner edge 30A is located between the display region and the outer edge 30B. Correspondingly, as shown in FIG. 2B, the sealant adhesive region where the sealant adhesive 30 is located is also a closed annular structure, an inner boundary 30A' of the sealant adhesive region corresponds to the inner edge 30A of the sealant adhesive 30 in FIG. 2A, and an outer boundary 30B' of the sealant adhesive region corresponds to the outer edge 30B of the sealant adhesive 30 in FIG. 2A.

It should be noted that, in the embodiments of the present disclosure, for any component (including but not limited to the sealant adhesive 30), an outer edge refers to an edge that is included by the component and is away from the display region, and an inner edge refers to an edge that is included by the component and is close to the display region.

For example, a material of the sealant adhesive 30 includes an organic insulating material such as a resin. For example, the sealant adhesive 30 is formed by coating a sealant adhesive material on the first substrate 10 or on the second substrate 20 and curing the sealant adhesive material.

As shown in FIG. 2B to FIG. 3D, in the display device provided by at least one embodiment of the present disclosure, an inorganic-layer removal region is disposed in the sealant adhesive region, that is, the inorganic-layer removal region does not exceed the inner edge 30A and the outer edge 30B of the sealant adhesive 30; for example, the inorganic-layer removal region is a closed annular structure; as shown in FIG. 3A to FIG. 3D, the display device provided by at least one embodiment of the present disclosure further includes the organic layer 11 and the inorganic layer 12 which are sequentially disposed on a side of the first substrate 10 facing the sealant adhesive 30, the inorganic layer 12 is located outside the inorganic-layer removal region, and the organic layer 11 includes a portion located within the inorganic-layer removal region, so the connection between the organic layer 11 and the sealant adhesive 30 in the inorganic-layer removal region is not affected by the inorganic layer 12, so that the sealant adhesive 30 and the organic layer 11 have a good adhesion effect.

The arrangement manner of the inorganic layer 12 will be described in detail below.

For example, the inorganic layer 12 is a single layer of an inorganic layer or a laminate of a plurality of inorganic thin films. For example, a material of the inorganic layer 12 includes at least one inorganic non-metallic material selected from the group consisting of silicon nitride, silicon oxide, silicon oxynitride, hafnium oxide and aluminum oxide. For example, the inorganic layer 12 has a thickness of 600-2000 angstroms, for example 600-800 angstroms. In the case where storage capacitor electrodes are respectively formed on two sides of the inorganic layer 12, the inorganic layer 12 is not too thick to ensure a charge retaining capability of a storage capacitor formed by the storage capacitor electrodes and the inorganic layer 12. For example, the inorganic layer 12 is formed by forming an inorganic material on the organic layer 11, and then removing at least a partial portion of the inorganic material in the sealant adhesive region to obtain the inorganic layer 12 and the inorganic-layer removal region.

For example, as shown in FIG. 3A to FIG. 3D, the inorganic layer 12 is in direct contact with the organic layer 11, that is, the inorganic layer 12 is adjacent to the organic layer 11.

For example, as shown in FIG. 3A to FIG. 3D, the inorganic layer 12 includes a first inorganic-layer pattern 121 including a first inorganic-layer extension portion 121A extending between the organic layer 11 and the sealant adhesive 30; the organic layer 11 includes the organic-layer overlap portion 111 overlapping the sealant adhesive 30, and the organic-layer overlap portion 111 includes the portion outside the region where the inorganic layer 12 is located; for example, the organic-layer overlap portion 111 includes a first portion 111A and a second portion 111B, the first portion 111A is covered by the first inorganic-layer extension portion 121A, and the second portion 111B is located outside a coverage region of the first inorganic-layer extension portion 121A. In the embodiment of the present disclosure, because the inorganic layer 12 extends between the organic layer 11 and the sealant adhesive 30, the sealant adhesive 30 covers a portion of the inorganic layer 12 (for example, the sealant adhesive 30 covers the first inorganic-layer extension portion 121A), so that the sealant adhesive 30 prevents the inorganic layer 12 from being warped to a certain extent.

For example, as shown in FIG. 3A to FIG. 3D, the first inorganic-layer extension portion 121A is in direct contact with the organic-layer overlap portion 111. In this case, the first portion 111A of the organic-layer overlap portion 111 is in direct contact with the first inorganic-layer extension portion 121A.

For example, as shown in FIG. 3A to FIG. 3D, the first inorganic-layer extension portion 121A extends from the sealed region to the sealant adhesive region, that is, the first inorganic-layer extension portion 121A extends from the display region to the non-display region. Thus, on the one hand, the first inorganic-layer extension portion 121A is prevented from being warped, thereby preventing particles formed due to the inorganic layer 12 being warped from entering the display region to cause display defects; on the other hand, because an outer edge of the first inorganic-layer extension portion 121A is not aligned with an outer edge 10A of the first substrate 10, the inorganic layer 12 is not easily cracked in grinding the first substrate 10, thereby further improving the sealing effect.

For example, as shown in FIG. 2A, FIG. 2B and FIG. 3C, the first substrate 10 has a protrusion 10B that exceeds the second substrate 20. In the display device, a region where the protrusion 10B is located is a bonding region, the display device is provided with a MUX (data selector), an IC (integrated circuit) and an FPC (flexible printed circuit board) on a side provided with the bonding region of the display device, and a plurality of conducting wires on the first substrate 10 are electrically connected with the IC in the bonding region; as shown in FIG. 3C, the inorganic layer 12 includes a portion located in the bonding region, and a short circuit between the conducting wires on the first substrate 10 is prevented from generating by providing the insulating inorganic layer 12 in the bonding region.

For example, as shown in FIG. 3C, the first inorganic-layer extension portion 121A extends from the sealed region to the sealant adhesive region, the inorganic layer 12 further includes a second inorganic-layer pattern 122 that is disconnected from the first inorganic-layer pattern 121, the second inorganic-layer pattern 122 is located between the first inorganic-layer pattern 121 and the outer edge 10A of the first substrate 10, the second inorganic-layer pattern 122 covers the protrusion 10B, the second inorganic-layer pattern 122 includes a second inorganic-layer extension portion 122A extending between the organic-layer overlap portion 111 and the sealant adhesive 30, and the inorganic-layer removal region extends from the first inorganic-layer extension portion 121A to the second inorganic-layer extension portion 122A. In the embodiment of the present disclosure, because the sealant adhesive 30 covers the second inorganic-layer extension portion 122A of the second inorganic-layer pattern 122, the sealant adhesive 30 prevents the second inorganic-layer pattern 122 from falling off the first substrate 10.

For example, as shown in FIG. 3C, the second inorganic-layer extension portion 122A is in direct contact with the sealant adhesive 30. For example, the second inorganic-layer extension portion 122A is in direct contact with the organic layer 11.

In the display device, a gate driver is disposed in a partial region of the non-display region; for example, the gate driver is a gate driver on array (GOA, as shown in FIG. 2A and FIG. 2B); for example, in FIG. 3A and FIG. 3B, a region where a transistor 14 (which includes a source electrode S, a drain electrode D, a gate electrode GE and an active layer ACT) is located is a region where the gate driver is located; in the non-display region, the region where the gate driver is located is usually located on two sides of the bonding region.

For example, in the non-display region of the display device, a region other than the bonding region (for example, the region where the gate driver is located on the two sides of the bonding region and a region opposite to the bonding region) is not provided with a structure that needs to be insulated by the inorganic layer 12 such as a conducting wire or the like, so the embodiments shown in FIG. 3A, FIG. 3B and FIG. 3D may be employed in these regions, that is, the first inorganic-layer extension portion 121A extends from the sealed region toward the sealant adhesive region without exceeding the outer edge of the sealant adhesive 30, and the inorganic layer 12 is not disposed between the first inorganic-layer extension portion 121A and the outer edge 10A of the first substrate 10, in which case the inorganic-layer removal region extends from the first inorganic-layer extension portion 121A to the outer edge 10A of the first substrate 10.

For example, in the embodiment shown in FIG. 3C, the inorganic-layer removal region has a width of 200 to 400 microns. For example, in the embodiments shown in FIG. 3A, FIG. 3B and FIG. 3D, the inorganic-layer removal region has the width of 150 to 300 microns. In other embodiments, the width of the inorganic-layer removal region may be set according to actual needs.

The arrangement manner of the organic layer 11 will be described in detail below.

For example, a material of the organic layer 11 includes an organic insulating material such as a resin. For example, the organic layer 11 is formed by performing a patterning process (which, for example, includes performing exposure by using a mask plate and then performing development and etching treatment, and the like) and then a curing treatment on the organic insulating material. In the display device, a plurality of electronic components are disposed on the first substrate 10, such as the transistor including the source electrode S, the drain electrode D, the gate electrode GE and the active layer ACT as shown in FIGS. 3A, 3B and 3D, and such as gate lines GL and data lines DL as shown in FIG. 3C, and the like electronic components; these electronic components are at different heights, and the organic layer 11 covering these electronic components is made thicker (for example, a thickness of the organic layer 11 is more than ten times of the thickness of the inorganic layer 12), so that the organic layer 11 fills recessed regions between these electronic components and forms a relatively flat upper surface, in which case the organic layer 11 is a planarization insulating layer having a planarization effect.

As described above, the non-display region of the display device includes a plurality of different regions: the IC is disposed in the bonding region of the non-display region, the region where the gate driver is located is on the two sides of the bonding region, and the non-display region further includes the region opposite to the bonding region. Due to different components provided in these regions, the organic layer 11 adopts different arrangements in these regions.

For example, the sealing structure as shown in each of FIG. 3A to FIG. 3B is employed in each of the region where the gate driver is located and the region opposite to the bonding region, so that the outer edge of the organic layer 11 is aligned with the outer edge 10A of the first substrate 10.

For example, the sealing structure as shown in FIG. 3D is employed in each of the region where the gate driver is located and the region opposite to the bonding region, such that the outer edge 11A of the organic layer 11 does not exceed the outer edge 30B of the sealant adhesive 30. In this case, the outer edge 11A of the organic layer 11 is located between the inner edge 30A and the outer edge 30B of the sealant adhesive 30, and the sealant adhesive 30 is filled between the outer edge 11A of the organic layer 11 and the outer edge 10A of the first substrate 10. This arrangement further improves the sealing effect.

For example, the embodiment as shown in FIG. 3C is employed in the bonding region, so that the organic layer 11 extends into the bonding region and so that the outer edge 11A of the organic layer 11 is not aligned with the outer edge 10A of the first substrate 10. In this case, the organic layer 11 covers only a part of the bonding region, and via holes corresponding to electronic components such as terminals of the IC are provided in the inorganic layer 12 and in a portion that is included by the bonding region and is not covered by the organic layer 11, so that the via holes pass through the thin inorganic layer 12 and do not pass through the thick organic layer 11, thereby avoiding poor connection at the via holes.

Some other structures in the display device will be described below.

For example, as shown in FIG. 3A to FIG. 3D, the display device provided by at least one embodiment of the present disclosure further includes a first alignment layer 13, and the organic layer 11, the inorganic layer 12 and the first alignment layer 13 are sequentially disposed between the first substrate 10 and the sealant adhesive 30; the first alignment layer 13 includes an alignment-layer extension portion 131 which extends from the sealed region and extends between the organic-layer overlap portion 111 and the sealant adhesive 30, and the alignment-layer extension portion 131 includes a portion outside the inorganic layer 12 (i.e., the alignment-layer extension portion 131 includes a portion located in the inorganic-layer removal region). In the embodiment of the present disclosure, because the alignment-layer extension portion 131 includes the portion located outside the inorganic layer 12, the alignment-layer extension portion 131 covers the inorganic layer 12 (for example, the alignment-layer extension portion 131 covers the first inorganic-layer extension portion 121A), so as to further prevent the inorganic layer 12 from being warped.

In the display device, the first alignment layer 13 is a film layer which is on the first substrate 10, is closest to the liquid crystal material 40 and is used to realize an initial orientation of the liquid crystal material. For example, the first alignment layer 131 is formed of polyimide or a similar organic material having a liquid crystal alignment function.

For example, as shown in FIG. 3A, an outer edge of the alignment-layer extension portion 131 is aligned with the outer edge 30B of the sealant adhesive 30, in which case the portion that is included by the organic-layer overlap portion 111 and is not covered by the inorganic-layer extension portion 121A is connected with the sealant adhesive 30 via the alignment-layer extension portion 131. In the display device, because the region where the gate driver is located is narrow, the embodiment shown in FIG. 3A is used in the region where the gate driver is located, so that the manufacturing process is easily realized.

For example, as shown in FIG. 3B to FIG. 3D, the alignment-layer extension portion 131 does not exceed the outer edge 30B of the sealant adhesive 30, that is, the outer edge of the alignment-layer extension portion 131 is located on a side of the outer edge 30B of the sealant adhesive 30 close to the inner edge 30A of the sealant adhesive 30. In the display device, because the bonding region and the region opposite to the bonding region have a large space, the embodiment shown in each of FIG. 3B to FIG. 3D is employed in each of the bonding region and the region opposite to the bonding region. In the embodiment of the present disclosure, because the alignment-layer extension portion 131 does not exceed the outer edge 30B of the sealant adhesive 30, the first alignment layer 13 is not exposed, which facilitates preventing external water and gas from entering the sealed region along the first alignment layer 13, thereby further improving the sealing effect.

For example, as shown in FIG. 3B to FIG. 3D, in the case where the alignment-layer extension portion 131 does not exceed the outer edge 30B of the sealant adhesive 30, the organic-layer overlap portion 111 further includes a third portion 111C adjacent to the second portion 111B, the third portion 111C is located on a side of the second portion 111B away from the first portion 111A, the alignment-layer extension portion 131 covers the second portion 111B of the organic-layer overlap portion 111, and the third portion 111C of the organic-layer overlap portion 111 is located outside the alignment-layer extension portion 131; for example, as shown in FIG. 3C, in the case where the alignment-layer extension portion 131 does not exceed the outer edge 30B of the sealant adhesive 30 and the inorganic layer 12 includes the first inorganic-layer pattern 121 and the second inorganic-layer pattern 122, the organic-layer overlap portion 111 further includes a fourth portion 111D adjacent to the third portion 111C, the fourth portion 111D is covered by the second inorganic-layer pattern 122 and the third portion is located outside the second inorganic-layer pattern 122.

For example, the first alignment layer 13 is in direct contact with both the sealant adhesive 30 and the inorganic layer 12. In this case, the first portion 111A of the organic-layer overlap portion 111 connects the sealant adhesive 30 only through the inorganic-layer extension portion 121A and the alignment-layer extension portion 131, the second portion 111B of the organic-layer overlap portion 111 connects the sealant adhesive 30 only through the alignment-layer extension portion 131, and the third portion 111C of the organic-layer overlap portion 111 is in direct contact with the sealant adhesive 30.

For example, as shown in FIG. 3A to FIG. 3D, the display device provided by at least one embodiment of the present disclosure further includes a gate insulating layer GI and an interlayer insulating layer CNT which are on the first substrate 10, the gate insulating layer GI is located between the gate electrode GE and the active layer ACT of the transistor 14, and the interlayer insulating layer is located between the gate electrode GE and the source electrode S/the drain electrode D of the transistor 14. For example, as shown in FIG. 3A to FIG. 3D, the display device provided by at least one embodiment of the present disclosure further includes a buffer layer BF on the first substrate 10, and the buffer layer BF is located between the first substrate 10 and the active layer ACT.

For example, the display device provided by at least one embodiment of the present disclosure is an ADS (advanced super-dimensional switching) mode liquid crystal display device, the side of the organic layer 11 facing the sealant adhesive 30 is disposed with a pixel electrode and a common electrode which are in different layers, in this case, the inorganic layer 12 is located between a layer where the pixel electrode is located and a layer where the common electrode is located, and the storage capacitor electrodes are respectively disposed on the two sides of the inorganic layer 12.

For example, as shown in FIG. 3A to FIG. 3D, the display device provided by at least one embodiment of the present disclosure further includes a second alignment layer 21 that extends between the sealant adhesive 30 and the second substrate 20.

For example, the second alignment layer 21 is a film layer which is on the second substrate 10, is closest to the liquid crystal material 40 and is used to achieve the initial orientation of the liquid crystal material. For example, the second alignment layer 21 is formed of polyimide or a similar organic material having the liquid crystal alignment function.

For example, the display device provided by at least one embodiment of the present disclosure further includes an organic cover layer 22 between the second alignment layer 21 and the second substrate 20. For example, the organic cover layer 22 is a film layer which is on the second substrate 20 and is used for playing a role of planarization.

For example, the display device provided by at least one embodiment of the present disclosure further includes a black matrix layer 23 between the organic cover layer 22 and the second substrate 20. The black matrix layer 23 is formed of a light-shielding material and is used for shielding components such as conducting wires on the first substrate 10 to prevent these components from affecting the display effect.

For example, the display device provided by the embodiments of the present disclosure may be any product or component with a display function, such as a display panel (for example, liquid crystal panel), an electronic paper, a mobile phone, a tablet computer, a television, a display, a notebook computer, a digital photo frame, a navigator and the like.

At least one embodiment of the present disclosure provides a sealing structure, as shown in FIG. 4A to FIG. 4D, the sealing structure includes the first substrate 10 and the second substrate 20 disposed opposite to each other, the sealing structure further includes the organic layer 11, the inorganic layer 12 and the sealant adhesive 30 which are disposed on the side of the first substrate 10 facing the second substrate 20 and are sequentially disposed; the organic layer 11 includes the organic-layer overlap portion 111 overlapping the sealant adhesive 30, and the organic-layer overlap portion 111 includes the portion outside the region where the inorganic layer 12 is located, that is, the inorganic layer 12 is not disposed between the portion and the sealant adhesive 30. In this case, the sealing structure includes the sealant adhesive region (i.e., the region between the outer edge 30B and the inner edge 30A of the sealant adhesive 30) where the sealant adhesive 30 is located and includes the sealed region which is sealed by the sealant adhesive 30 and is adjacent to the sealant adhesive region, the inorganic-layer removal region is disposed in the sealant adhesive region, and the inorganic layer 12 is located outside the inorganic-layer removal region. In the embodiment of the present disclosure, because the inorganic layer 12 is not disposed in the inorganic-layer removal region, the connection between the sealant adhesive 30 and the organic layer 11 in the inorganic-layer removal region does not need the inorganic layer 12, so that better sealing effect is obtained.

The sealing structure provided by at least one embodiment of the present disclosure may be used in the display device (for example, the liquid crystal display device) or in other structure in which the sealant adhesive 30 is used to connect two substrates and the inorganic layer 12 is between the sealant adhesive 30 and the organic layer 11.

For example, the inorganic layer 12 is in direct contact with the organic layer 11.

For example, the inorganic layer 12 includes the first inorganic-layer pattern 121, and the first inorganic-layer pattern 121 includes the first inorganic-layer extension portion 121A extending between the organic layer 11 and the sealant adhesive 30; the organic-layer overlap portion 111 includes the first portion 111A and the second portion 111B which are adjacent to each other, the first portion 111A is covered by the first inorganic-layer extension portion 121A, and the second portion 111B is located outside the coverage region of the first inorganic-layer extension portion 121A. In the embodiment of the present disclosure, because the inorganic layer 12 extends between the organic layer 11 and the sealant adhesive 30, the sealant adhesive 30 covers a part of the inorganic layer 12 (e.g., the sealant adhesive 30 covers the first inorganic-layer extension portion 121A), so that the sealant adhesive 30 prevents the inorganic layer 12 from being warped to a certain extent.

For example, the first inorganic-layer extension portion 121A extends from the sealed region toward the sealant adhesive region. Thus, on the one hand, the first inorganic-layer extension portion 121A is prevented from being warped; on the other hand, because the outer edge of the first inorganic-layer extension portion 121A is not aligned with the outer edge 10A of the first substrate 10, the inorganic layer 12 is not easily cracked in grinding the first substrate 10, thereby further improving the sealing effect.

For example, the inorganic layer 12 further includes the second inorganic-layer pattern 122A that is disconnected from the first inorganic-layer pattern 121, the second inorganic-layer pattern 122A is located between the first inorganic-layer pattern 121 and the outer edge of the first substrate 10, and the second inorganic-layer pattern 122A includes the second inorganic-layer extension portion 122A that extends between the organic-layer overlap portion 111 and the sealant adhesive 30.

For example, the first substrate 10 has the protrusion 10B that extends beyond the second substrate 20, and the second inorganic-layer pattern 122A covers the protrusion 10B.

For example, the sealing structure provided by at least one embodiment of the present disclosure further includes the first alignment layer 13, and the organic layer 11, the inorganic layer 12 and the first alignment layer 13 are sequentially disposed between the first substrate 10 and the sealant adhesive 30; the first alignment layer 13 includes the alignment-layer extension portion 131 extending between the organic-layer overlap portion 111 and the sealant adhesive 30, and the alignment-layer extension portion 131 includes the portion outside the inorganic layer 12. In the embodiment of the present disclosure, because the alignment-layer extension portion 131 includes the portion located outside the inorganic layer 12, the alignment-layer extension portion 131 covers the inorganic layer 12 (for example, the alignment-layer extension portion 131 covers the first inorganic-layer extension portion 121A) to further prevent the inorganic layer 12 from being warped.

Figure 4A:
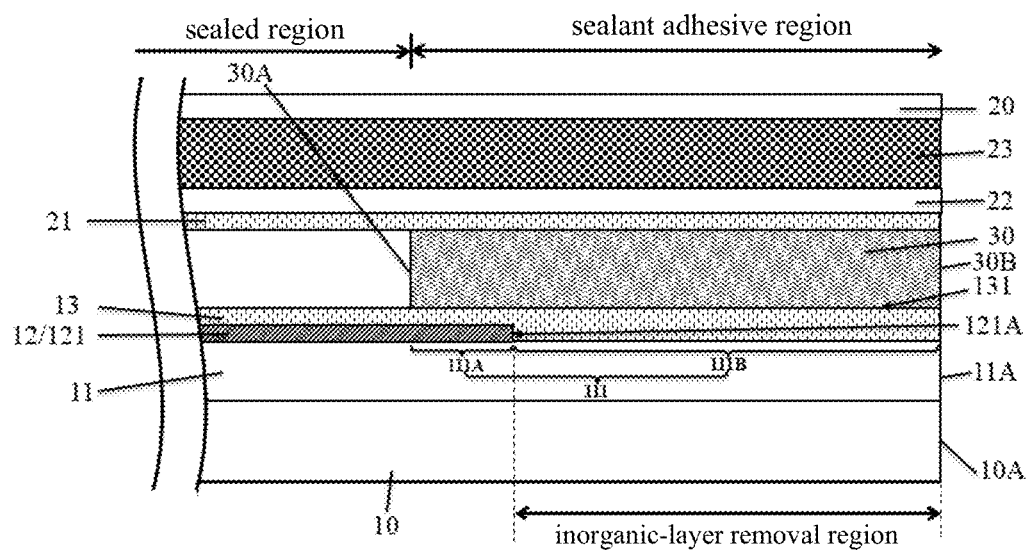
FIG. 4A to FIG. 4D are schematic cross-sectional views of a sealing structure according to the embodiments of the present disclosure.
Figure 4B:
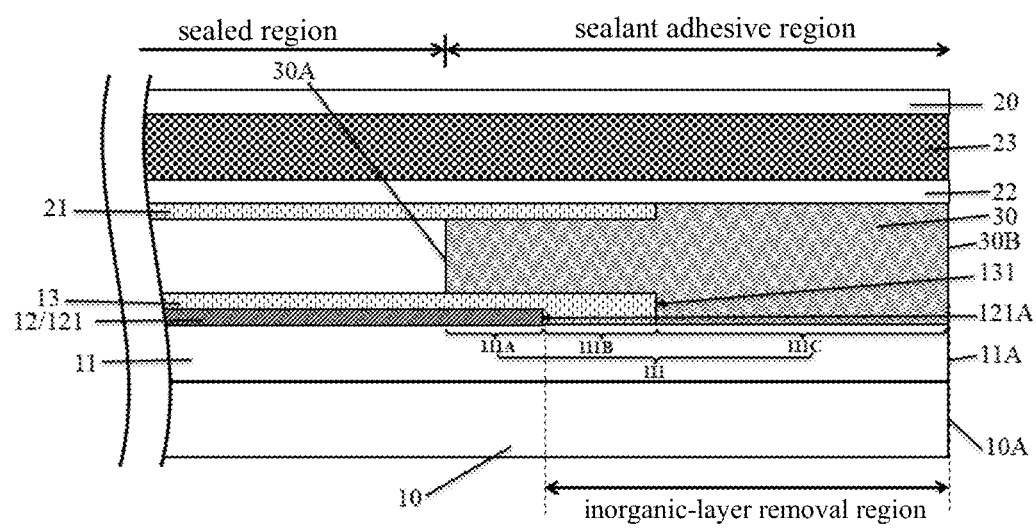
Figure 4C:
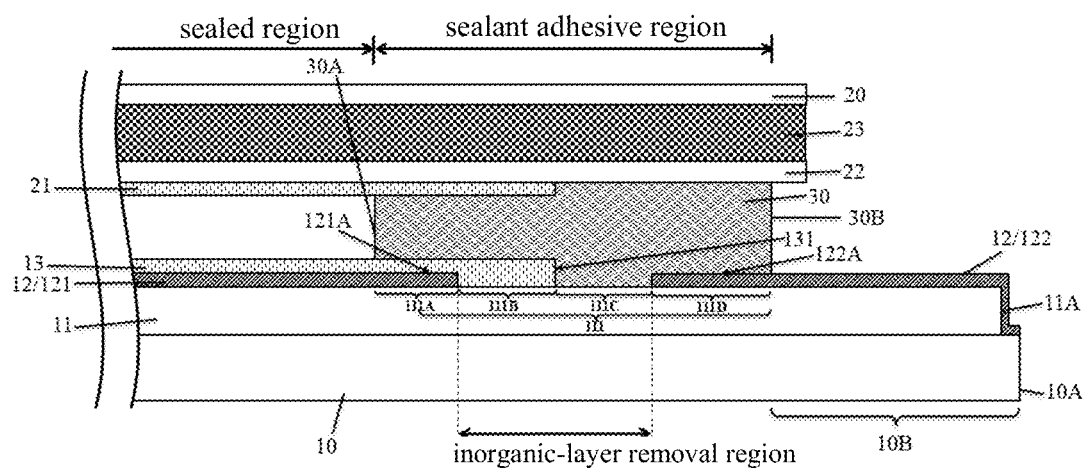
Figure 4D:
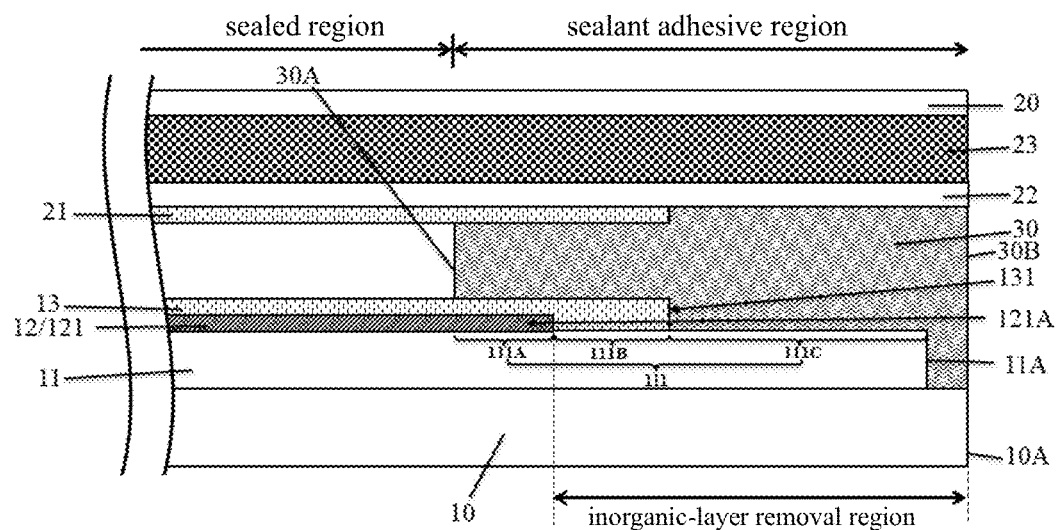

For example, the alignment-layer extension portion 131 does not exceed the outer edge 30B of the sealant adhesive 30. For example, as shown in FIG. 4B to FIG. 4D, in the case where the alignment-layer extension portion 131 does not exceed the outer edge 30B of the sealant adhesive 30, the organic-layer overlap portion 111 further includes the third portion 111C adjacent to the second portion 111B, the third portion 111C is located on the side of the second portion 111B away from the first portion 111A, the alignment-layer extension portion 131 covers the second portion 111B of the organic-layer overlap portion 111, and the third portion 111C of the organic-layer overlap portion 111 is located outside the alignment-layer extension portion 131; for example, as shown in FIG. 4C, in the case where the alignment-layer extension portion 131 does not exceed the outer edge 30B of the sealant adhesive 30 and the inorganic layer 12 includes the first inorganic-layer pattern 121 and the second inorganic-layer pattern 122, the organic-layer overlap portion 111 further includes the fourth portion 111D adjacent to the third portion 111C, the fourth portion 111D is covered by the second inorganic-layer pattern 122 and the third portion is located outside the second inorganic-layer pattern 122.

For example, the outer edge 11A of the organic layer 11 is located between the inner edge 30A of the sealant adhesive 30 and the outer edge 30B of the sealant adhesive 30; the sealant adhesive 30 is filled between the outer edge 11A of the organic layer 11 and the outer edge 10A of the first substrate 10.

For example, the sealing structure provided by at least one embodiment of the present disclosure further includes the second alignment layer 21 on the side of the second substrate 20 facing the sealant adhesive 30, and the second alignment layer 21 extends between the sealant adhesive 30 and the second substrate 20.

For example, the sealing structure provided by at least one embodiment of the present disclosure further includes the organic cover layer 22 between the second alignment layer 21 and the second substrate 20.

For example, the sealing structure provided by at least one embodiment of the present disclosure further includes the black matrix layer 23 between the organic cover layer 22 and the second substrate 20.

For the arrangement manners of the components in the sealing structure provided by the embodiments of the present disclosure, reference may be made to the related description in the embodiments of the above display device, and the repeated description is omitted.

Figure 5A:
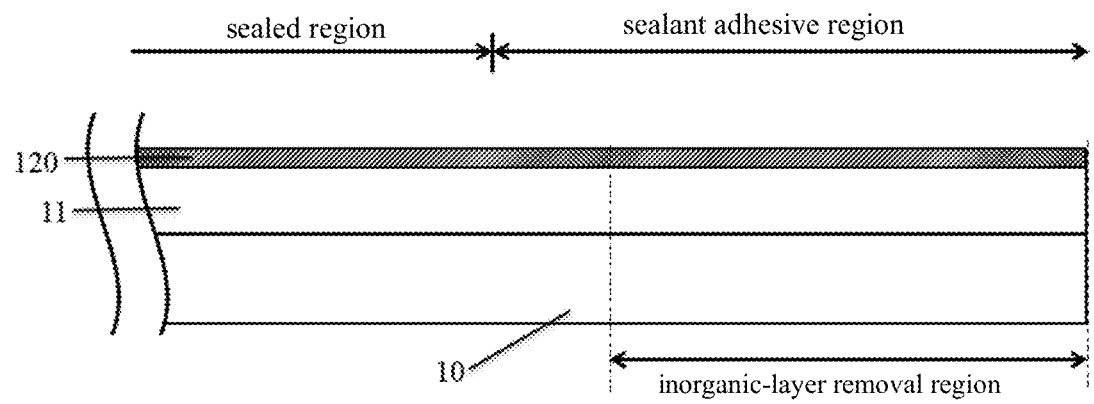
FIG. 5A and FIG. 5B are views showing steps of manufacturing the sealing structure according to the embodiments of the present disclosure.
Figure 5B:
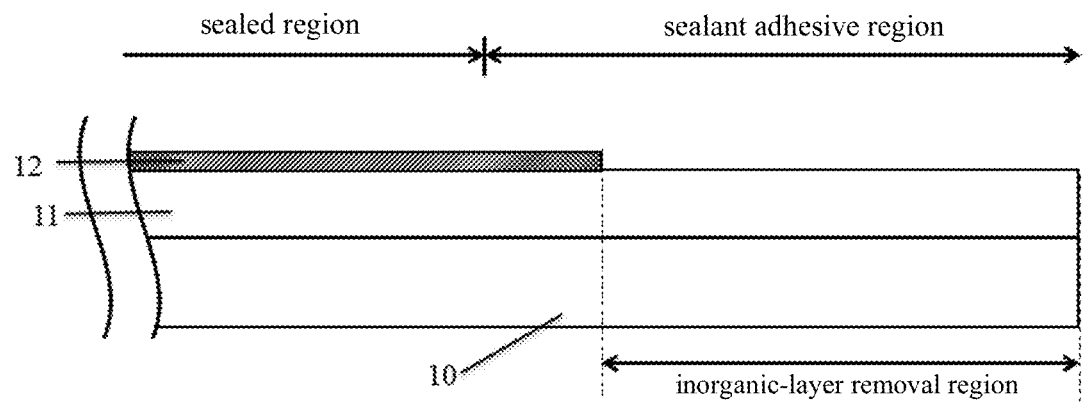

At least one embodiment of the present disclosure further provides a manufacturing method of the sealing structure as shown in FIG. 4A to FIG. 4D, and the method includes: as shown in FIG. 5A, sequentially forming the organic layer 11 and an inorganic material 120 on the first substrate 10, in which step, the first substrate 10 has the sealant adhesive region to be formed with the sealant adhesive 30 and the sealed region surrounded by the sealant adhesive region, and the organic layer 11 and the inorganic material 120 cover the sealant adhesive region and the sealed region; as shown in FIG. 5B, forming the inorganic layer 12 by removing a portion that is included by the inorganic material 120 and is located in the sealant adhesive region, so that the inorganic layer 12 exposes a portion of a surface that is included by the organic layer 11 and is in the sealant adhesive region; afterwards, forming the sealant adhesive 30 in the sealant adhesive region so that the sealant adhesive 30 connects the first substrate 10 and the second substrate 20 opposite to the first substrate 10, as shown in FIG. 4A to FIG. 4D.

For example, the inorganic layer 12 is obtained by exposing the inorganic material 120 with a mask plate, followed by development, etching (for example, ion bombardment etching) and the like.

For example, the organic layer 11 is formed by performing a patterning process (which, for example, includes performing exposure by using a mask plate and then performing development and etching treatment, and the like) and then a curing treatment on the organic insulating material.

For example, the sealant adhesive 30 is formed by coating the sealant adhesive material on the first substrate 10 or on the second substrate 20 and curing the sealant adhesive material.

For the manners of setting the various components in the manufacturing method provided by the embodiments of the present disclosure, reference may be made to the related descriptions in the embodiments of the above display device and the sealing structure, and the repeated description is omitted.

The following points need to be explained: (1) in the drawings of the embodiments of the present disclosure, only the structures related to the embodiments of the present disclosure are referred to, and other structures may refer to the general designs; (2) in the case of no conflict, the embodiments of the present disclosure and the features in the embodiments can be combined with each other.

What are described above is related to the illustrative embodiments of the disclosure only and not limitative to the scope of the disclosure; the scopes of the disclosure are defined by the accompanying claims.

What is claimed is:

1. A display device, comprising:
   a first substrate and a second substrate which are opposite to each other;
   an organic layer, an inorganic layer and a sealant adhesive which are on a side of the first substrate facing the second substrate and are arranged sequentially, wherein the organic layer comprises an organic-layer overlap portion, an orthographic projection of the organic-layer overlap portion on the first substrate overlaps an orthographic projection of the sealant adhesive on the first substrate, and the organic-layer overlap portion comprises a portion outside a region where the inorganic layer is located;
   wherein the display device has a display region and a non-display region outside the display region, and the sealant adhesive is in the non-display region;

the non-display region comprises a first region, a second region, and a third region, the second region is opposite to the third region, the first region is between the second region and the third region in an arranging direction of the second region and the third region;

in the second region, the first substrate has a protrusion exceeding the second substrate;

in the second region, the inorganic layer comprises a first inorganic-layer pattern and a second inorganic-layer pattern disconnected from each other, the second inorganic-layer pattern is between the first inorganic-layer pattern and an outer edge of the first substrate in a direction in which the inorganic layer extends, and the second inorganic-layer pattern comprises a second inorganic-layer extension portion extending between the organic-layer overlap portion and the sealant adhesive, wherein, in the third region, the organic layer is continuous in a region where the sealant adhesive is located and not beyond the region where the sealant adhesive is located;

in the third region, an outer edge of the organic layer is between an inner edge of the sealant adhesive and an outer edge of the sealant adhesive; and in the third region, the sealant adhesive is filled between the outer edge of the organic layer and an outer edge of the first substrate.

2. The display device according to claim 1, further comprising a second alignment layer on a side of the second substrate facing the sealant adhesive, wherein the second alignment layer extends between the sealant adhesive and the second substrate.

3. The display device according to claim 2, further comprising an organic cover layer, wherein the organic cover layer is between the second alignment layer and the second substrate.

4. The display device according to claim 3, further comprising a black matrix layer, wherein the black matrix layer is between the organic cover layer and the second substrate.

5. The display device according to claim 1, wherein, in the first region, the organic layer is continuous in an area where the sealant adhesive is located and not beyond a region where the sealant adhesive is located, in the first region, the outer edge of the organic layer is aligned with the outer edge of sealant adhesive.

6. The display device according to claim 1, wherein the inorganic layer is in direct contact with the organic layer.

7. The sealing structure according to claim 1, wherein "the organic-layer overlap portion comprises a first portion and a second portion which are adjacent to each other, the first portion is covered by the first inorganic-layer extension portion, and the second portion is outside a coverage region of the first inorganic-layer extension portion.

8. The display device according to claim 7, wherein
the display device comprises a sealant adhesive region where the sealant adhesive is located and a sealed region sealed by the sealant adhesive and adjacent to the sealant adhesive region;
the first inorganic-layer extension portion extends from the sealed region toward the sealant adhesive region.

9. The display device according to claim 1, wherein the second inorganic-layer pattern covers the protrusion.

10. The display device according to claim 1, further comprising a first alignment layer, wherein
the organic layer, the inorganic layer and the first alignment layer are sequentially arranged between the first substrate and the sealant adhesive;

the first alignment layer comprises an alignment-layer extension portion extending between the organic-layer overlap portion and the sealant adhesive, and the alignment-layer extension portion comprises a portion outside the inorganic layer.

11. The display device according to claim 10, wherein the alignment-layer extension portion does not exceed an outer edge of the sealant adhesive.

12. A sealing structure, comprising:
a first substrate and a second substrate which are opposite to each other;
an organic layer, an inorganic layer and a sealant adhesive which are on a side of the first substrate facing the second substrate and are arranged sequentially, wherein the organic layer comprises an organic-layer overlap portion, an orthographic projection of the organic-layer overlap portion on the first substrate overlaps an orthographic projection of the sealant adhesive on the first substrate, and the organic-layer overlap portion comprises a portion outside a region where the inorganic layer is located;
a first region, a second region, and a third region, the second region is opposite to the third region, the first region is between the second region and the third region in an arranging direction of the second region and the third region;
in the second region, the first substrate has a protrusion exceeding the second substrate; and
in the second region, the inorganic layer comprises a first inorganic-layer pattern and a second inorganic-layer pattern disconnected from each other, the second inorganic-layer pattern is between the first inorganic-layer pattern and an outer edge of the first substrate in a direction in which the inorganic layer extends, and the second inorganic-layer pattern comprises a second inorganic-layer extension portion extending between the organic-layer overlap portion and the sealant adhesive;
wherein, in the third region, the organic layer is continuous in a region where the sealant adhesive is located and not beyond the region where the sealant adhesive is located;
in the third region, an outer edge of the organic layer is between an inner edge of the sealant adhesive and an outer edge of the sealant adhesive; and
in the third region, the sealant adhesive is filled between the outer edge of the organic layer and an outer edge of the first substrate.

13. The sealing structure according to claim 12, wherein "the organic-layer overlap portion comprises a first portion and a second portion which are adjacent to each other, the first portion is covered by the first inorganic-layer extension portion, and the second portion is outside a coverage region of the first inorganic-layer extension portion.

14. The sealing structure according to claim 13, wherein
the sealing structure comprises a sealant adhesive region where the sealant adhesive is located and a sealed region sealed by the sealant adhesive and adjacent to the sealant adhesive region;
the first inorganic-layer extension portion extends from the sealed region toward the sealant adhesive region.

15. The sealing structure according to claim 14, wherein the first substrate has a protrusion exceeding the second substrate, and the second inorganic-layer pattern covers the protrusion.

16. The sealing structure according to claim 12, further comprising a first alignment layer, wherein the organic layer, the inorganic layer and the first alignment layer are sequentially arranged between the first substrate and the sealant adhesive;

the first alignment layer comprises an alignment-layer extension portion extending between the organic-layer overlap portion and the sealant adhesive, and the alignment-layer extension portion comprises a portion outside the inorganic layer.

\* \* \* \* \*